US007238319B2

United States Patent
Brennan et al.

(10) Patent No.: US 7,238,319 B2
(45) Date of Patent: Jul. 3, 2007

(54) METHOD FOR FABRICATING CERAMIC ARTICLES CONTAINING ORGANIC COMPOUNDS

(75) Inventors: John H. Brennan, Horseheads, NY (US); Gregory P. Dillon, Elmira Heights, NY (US); Tudor C. Gheorghiu, Painted Post, NY (US); Michael J. Vayansky, Osceola, PA (US)

(73) Assignee: Corning Incorporated, Corning, NY (US)

( * ) Notice: Subject to any disclaimer, the term of this patent is extended or adjusted under 35 U.S.C. 154(b) by 472 days.

(21) Appl. No.: 10/606,509

(22) Filed: Jun. 26, 2003

(65) Prior Publication Data

US 2004/0262820 A1 Dec. 30, 2004

(51) Int. Cl.
*C04B 33/32* (2006.01)
*C04B 28/00* (2006.01)

(52) U.S. Cl. ............ 264/648; 264/631; 264/669; 264/656

(58) Field of Classification Search ........... 264/631, 264/656, 657, 648, 669, 670
See application file for complete search history.

(56) References Cited

U.S. PATENT DOCUMENTS

| | | | |
|---|---|---|---|
| 3,711,336 A | 1/1973 | Smatko | |
| 4,011,291 A | 3/1977 | Curry | |
| 4,738,753 A | 4/1988 | Corato et al. | |
| 5,525,280 A | 6/1996 | Shukla et al. | |
| 6,027,684 A | 2/2000 | Gheorghiu et al. | |
| 6,080,345 A * | 6/2000 | Chalasani et al. | 264/109 |
| 6,099,793 A | 8/2000 | Dull et al. | |
| 6,132,671 A * | 10/2000 | Beall et al. | 264/630 |
| 6,200,517 B1 | 3/2001 | Peng et al. | |
| 6,241,940 B1 | 6/2001 | Beall et al. | |
| 6,287,509 B1 | 9/2001 | Gheorghiu | |
| 6,287,510 B1 | 9/2001 | Xun | |
| 6,325,963 B1 | 12/2001 | Dull et al. | |
| 2004/0079469 A1 | 4/2004 | Chan et al. | 156/89.11 |

FOREIGN PATENT DOCUMENTS

| | | |
|---|---|---|
| EP | 0 200 200 | 11/1986 |
| EP | 0 306 034 | 3/1989 |
| EP | 0 456 441 | 11/1991 |
| EP | 0 596 711 | 5/1994 |

OTHER PUBLICATIONS

Y. F. Chan et al, "Process for Removing Oil-Based Components and Forming Ceramic Bodies," U.S. Appl. No. 60/422,191, filed Oct. 29, 2002.

* cited by examiner

*Primary Examiner*—Carlos Lopez
(74) *Attorney, Agent, or Firm*—Randall S. Wayland; Anca C. Gheorghiu

(57) ABSTRACT

A method for fabricating a green ceramic article containing organic compounds. The method involves first heating the green ceramic article to sequentially remove the organic compounds such that the organic compound with the lowest weight loss onset temperature is substantially removed prior to the next higher weight loss onset temperature organic compound. The organic compounds include but are not limited to at least an oil or oil-based compound having a flash point or an ignition temperature, higher than the weight loss onset temperature. For this system the temperature during heating is maintained below the flash point of the oil or oil-based compound until substantial removal thereof from the green ceramic structural body. After the organic compounds are substantially removed, the green ceramic article is further fired to a temperature and for a time to obtain a final fired body.

21 Claims, 3 Drawing Sheets

METHOD FOR FABRICATING CERAMIC ARTICLES CONTAINING ORGANIC COMPOUNDS

BACKGROUND OF THE INVENTION

The present invention relates to a method for fabricating ceramic articles, and in particular to a method for firing cellular ceramic bodies formed from batch mixtures containing inorganic ceramic powdered raw materials and organic forming compounds.

Popular ceramic multicellular ceramic bodies which are generally formed by extrusion, such as those finding applications in catalytic converters, diesel particulate filters, electrically heated catalysts, and chemical processing, require binders and extrusion aids for proper processing. Typically, water-soluble cellulose ether binders are used; however, such binders alone are not suitable for the manufacture of high cell density cellular structures having a large frontal area and extremely thin walls of less than webs of 0.002 inch (0.048 mm) or less. U.S. Pat. Nos. 6,080,345 and 6,368,992 disclose the use of oils or oil-based compounds, such as polyalphyl olefin, in combination with cellulose ether binders for improved processing of such structures.

While advantageous in providing shape retention for very thin-wall ceramics in the wet green strength, oils lead to significant problems during firing. Specifically, such compounds release small volatile combustibles when heated, which unless controlled effectively can lead not only to cracking of the structural bodies, but also to uncontrolled combustion, or detonation in the kiln. At temperatures above their flash points, the oils decompose quickly and lead to sudden thermal stresses which may increase the risk of cracking in the ceramic articles.

Removal of the organic compounds during firing comprises a sequence of simultaneous reactions which are fairly complex, including, for example, oxidation, volatilization, and thermal degradation. Therefore, it is difficult to remove the organic components from the shaped green ceramic article without incurring distortion or breakage of the part.

Because of the reduced strength of the very twin-wall ceramic honeycomb substrates, and the corresponding increase in the dimensional changes due to the exothermic nature of the removal of the organic compounds, special consideration in the firing must be undertaken to avoid cracking of the ceramic body. Specially designed kilns, apparatus for volatile removal, reduced oxygen containing atmospheres, and complicated firing cycles are among the numerous means that have been employed to control the burnout of organic compounds, decrease the combustible concentrations in the kiln atmosphere, and reduce the thermal stresses differential shrinkage and high cracking frequency. These methods however, require expensive and sophisticated equipment and increase the cost of firing.

In light of the foregoing problems experienced in the art, there remains a need for a method of fabricating and firing ceramic articles processed from batch mixtures containing organic compounds which may include oils or oil-based compounds, which permit safe firing in oxidizing atmospheres with reduced combustible concentrations, to form ceramic honeycomb structural bodies exhibiting less cracks, in a cost-effective and efficient manner.

SUMMARY OF THE INVENTION

In the practice of the present invention there is provided an effective process for fabricating ceramic articles, such as honeycomb structural bodies, under safe firing conditions in oxidizing atmospheres, the ceramic articles being substantially free of any detrimental effects resulting from being formed from batch mixtures containing organic compounds which may include an oil or oil-based compound.

In one aspect of the invention there is provided a method for fabricating a fired ceramic article, the method comprising forming a batch mixture of components comprising of inorganic ceramic powder materials and organic compounds, the organic compounds having weight loss onset temperatures of varying values, the batch mixture being capable of yielding a fired ceramic article; intimately blending the components to form a workable and plasticized mixture; shaping the plasticized mixture into a green ceramic structural body and thereafter drying; heating the green ceramic structural body in a first phase, the heating being done in an oxidizing atmosphere to a temperature and for a time to enable sequential removal of the organic compounds, such that the organic compound with the lowest weight loss onset temperature is substantially removed prior to the next higher weight loss onset temperature organic compound; and, further heating the green ceramic structural body in a second phase to a temperature and for a time to initiate and sufficiently achieve the conversion of the green ceramic structural body into a fired ceramic article.

In an embodiment, the organic compounds comprise at least an oil or oil-based compound having a flash point in addition to having a weight loss onset temperature, the flash point being higher than the weight loss onset temperature. For such a system, the temperature during the first phase of firing is maintained below the flash point of the oil or oil-based compound until it is substantially removed from the green ceramic structural body. Suitable oils include low molecular oils, such as those disclosed in U.S. Pat. No. 6,368,992 herein incorporated by reference in its entirety, including but not limited to polyalphyl olefin.

In another aspect of the invention there is provided a method of firing a green ceramic structural body containing organic compounds, including but not limited to an oil or oil-based compound, a binder and optionally other organic components, the method comprising firing the green ceramic structural body in an atmosphere containing up to 21% by volume $O_2$ to a temperature and for a time to substantially remove the oil or oil-based compound prior to release of the binder and other optional organic components; and, further firing the green ceramic structural body to a temperature and for a time to initiate and sufficiently achieve the conversion of the green ceramic structural body into a fired ceramic article.

In an embodiment, the inorganic powdered materials are a mixture of cordierite-forming raw materials and include, clay, talc, alumina and other cordierite-forming raw materials, each of the raw materials included in an effective amount which in combination with the organics, is capable of yielding a fired ceramic body whose main phase is cordierite. The fired ceramic body is preferably a honeycomb structure.

BRIEF DESCRIPTION OF THE DRAWINGS

A complete understanding of the present invention may be obtained by referenced to the accompanying drawings, when considered in conjunction with the subsequent detailed description, in which.

DESCRIPTION OF THE INVENTION

Figure 1:
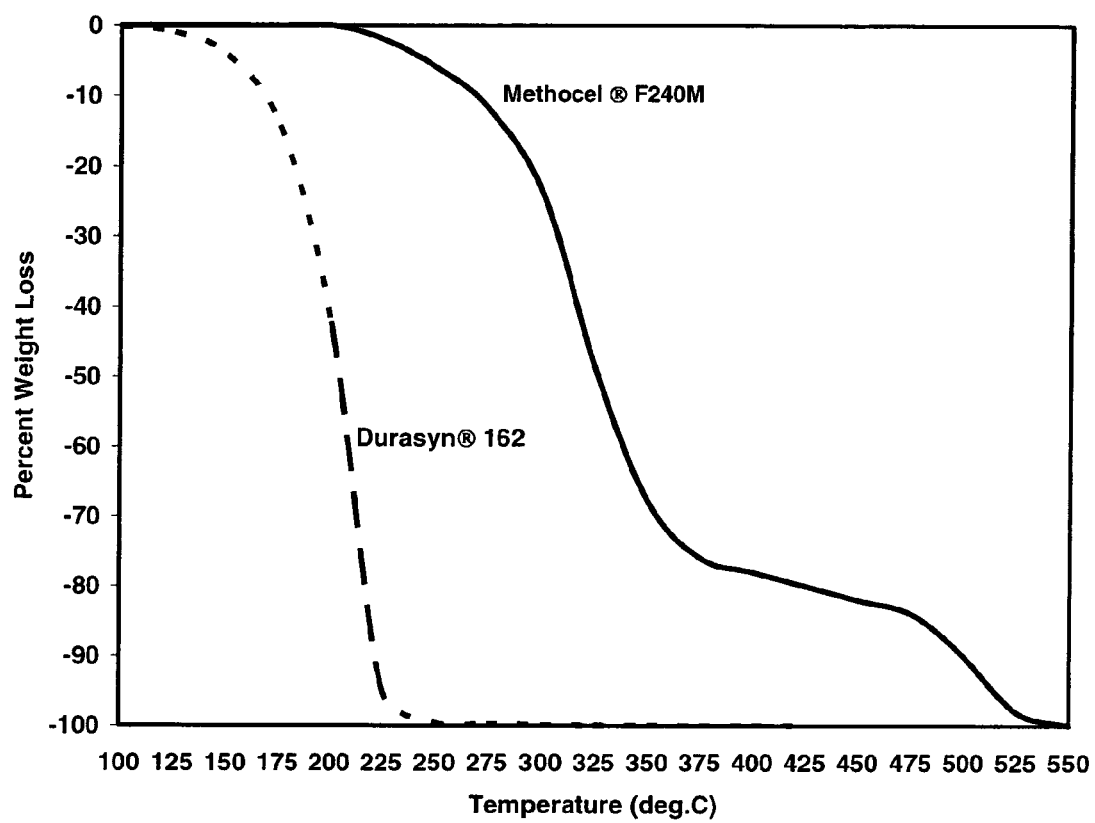
FIG. 1 is a TGA analysis of Durasyn® 162 oil and Methocel® F240M binder.

The invention is applicable to ceramic powder processing which includes the formation of shaped articles from inorganic raw material powders and organic compounds. However, the invention is particularly suitable to the formation of ceramic articles which contain cordierite, and/or mullite. Examples of such mixtures being 2% to 60% mullite, and 30% to 97% cordierite, with allowance for other phases, typically up to 10% by weight. Some ceramic batch material compositions for forming cordierite that are especially suited to the practice of the present invention are those disclosed in U.S. Pat. No. 3,885,977 which is herein incorporated by reference in its entirety.

One composition which ultimately forms cordierite upon firing is as follows in percent by weight: 33% to 41%, and most preferably 34% to 40% of aluminum oxide, 46% to 53% and most preferably 48% to 52% of silica, and 11% to 17%, and most preferably 12% to 16% magnesium oxide. Suitable cordierite-forming inorganic ceramic powder raw materials for the purpose of forming cordierite-containing ceramic articles may be selected from any source, and preferably include high-purity clay, talc, silica, alumina, aluminum hydroxides, and magnesia (MgO)-yielding raw materials. The preferred inorganic ceramic raw materials include kaolinite clay, talc, and alumina.

Types of clay are non-delaminated kaolinite raw clay, such as Hydrite MP™ clay, or Hydrite PX™ clay, delaminated kaolinite, such as KAOPAQUE-10™ (K10) clay, and calcined clay, such as Glomax LL™. All of the above named materials are sold by Dry Branch Kaolin. Some typical kinds of talc are those having a surface area of about 5-8 $m^2/g$, such as supplied by Barretts Minerals, under the designation MB 96-67™. Some typical aluminas are coarse aluminas, for example, Alcan C-700 series, such as C-701™, or fine aluminas such as A-16SG™ from Alcoa. One typical kind of silica is that having a particle size of about 9-11 micrometers, and a surface area of about 4-6 $m^2/g$, such as IMSIL™ sold by Unimin Corporation.

The inorganic ceramic raw materials are combined with organic compounds which according to the present invention include but are not limited to binders, lubricants, surfactants, and the like. The organic compounds have a weight loss onset temperature of varying values. The weight loss onset temperature is the temperature at which organic compound is removed during heating. In one embodiment, the organic compounds include an oil or oil-based compound, a binder, and optionally other organic processing aids such as surfactant. A solvent for the binder is also provided which may or may not be an organic.

Suitable oil or oil-based compounds in the formation of cordierite ceramic articles according to the present invention are low molecular oils (e.g., Durasyn® 162 HP polyalpholefin, available from Amoco Chemicals). A binder acts to bind the inorganic powders and impart plasticity to the batch when mixed with a solvent. Especially useful in the practice of this invention are cellulose ether binders, such as methylcellulose, and/or methylcellulose derivatives. A solvent for the binder is provided to dissolve the binder, and further provide plasticity to the batch and wetting of the powders.

The solvent can be aqueous or organic-based, which is normally water or another water-miscible solvent. For cellulose ether binders, the solvent is water. The surfactant, if present, promotes emulsification between the solvent and oil. Some surfactants that can be used in the practice of the present invention are stearic acid, oleic acid, and combinations of these.

The inorganic raw materials are mixed together with the organic compounds and solvent to form a plasticized batch mixture. In a preferred embodiment, the batch composition comprises 100 parts by weight of inorganic powder raw materials, 4 to 10 parts by weight of the oil, 2 to 5 parts by weight of the binder, 0.2 to 1 parts by weight of the surfactant, and 8 to 25 parts by weight of the solvent.

Batch formation takes place in two stages prior to the shaping step. In the first stage or wetting stage of batch formation, the inorganic powder particles, surfactant (if present), and the binder component are dry mixed followed by addition of the solvent such as in a Littleford mixer. The solvent is added in an amount that is less than is needed to plasticize the batch. The powder particles are coated and dispersed by the surfactant, solvent, and oil. In a second stage the plasticization takes place. In this stage the wet mix from the first stage is sheared in any suitable mixer in which the batch will be plasticized.

The resulting plasticized batch is then shaped into a green structural body by any known method for shaping plasticized mixtures, such as e.g. extrusion, injection molding, slip casting, centrifugal casting, pressure casting, dry pressing, and the like. The invention is best suited for extrusion through a die. The extrusion operation can either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The ceramic articles of this invention can have any convenient size and shape and the invention is applicable to all processes in which plastic powder mixtures are shaped. The process is especially suited to the production of cellular monolith bodies such as honeycombs. Cellular bodies find use in a number of applications such as catalytic, adsorption, electrically heated catalysts, filters such as diesel particulate filters, molten metal filters, regenerator cores, and the like.

The green ceramic structural bodies are dried according to conditions well known in the art, and thereafter are fired according to conditions described as follow. Organic materials of the type described above are typically removed from green ceramic bodies in the temperature region of about 100°-600° C. The major obstacle in using mixtures with organics is that the articles crack when fired, particularly in very thin wall honeycomb structures. The cracking is a result of internal stresses developed during the removal of large amount of organics which causes excessive temperature or pressure gradients internal to the bodies. Furthermore, the fast release of organics over a narrow temperature range can produce dangerously high concentrations of combustible compounds in the kiln atmosphere and potentially explosions.

The firing method of the present invention reduces or eliminates not only the cracking but also dangerous levels of combustibles in the kiln atmosphere, thus promoting a cost effective and safe ceramic forming process. Accordingly, the green structural body is fired in a first phase which includes heating in an oxidizing atmosphere, at up to 21% by volume $O_2$, to a temperature and for a time to enable sequential removal of the organic compounds. By sequential removal is meant that organic materials are removed individually based on their weight loss onset temperature, with the organic material having the lowest weight loss onset temperature being removed first, and the organic material with the highest weight loss onset temperature being removed last. By weight loss onset temperature is meant the temperature at which the organic compound is removed from the green ceramic body by any means including evaporation, sublimation, oxidation, or decomposition. The weight loss onset temperature is determined by thermogravimetric (TGA) analysis. The organic compounds in the present invention have weight loss onset temperatures of varying value. Generally, in a system having two or more organic compounds, according to the present invention a first organic compound has a first weight loss onset temperature which is lower than a higher weight loss temperature of a second organic compound.

During firing levels of volatile organic compounds are kept at a minimum in the kiln atmosphere. The minimum concentration of volatile combustibles in which a flame can be propagated is known as the Lower Flammability Limit or LFL (also referred to as "Lower Explosive Limit", LEL) and has units of percentage. In particular a LFL level of 70% means that the atmosphere contains a combustible volatile compound or mixture of combustible volatile compounds in a concentration equal to 70% of the composite Lower Flammability Limit of the mixture. At 100% LFL the atmosphere can sustain and propagate a flame. It is preferred that the maximum measured percentage of LFL be as low as possible, but no greater than 30-40%. By measured percentage of LFL is meant the percentage of LFL level or combustible concentration measured in the kiln atmosphere by suitable means, such as with an LFL detector device.

In practice the green ceramic structural body is heated at or above the weight loss onset temperature of the first or lowest temperature organic, but below the weight loss onset temperature of the second or next higher temperature organic, for a time until the first organic is substantially removed. The temperature is then increased to at or above the weight loss onset temperature of second temperature organic until there is substantial removal thereof. The process is repeated until all the organic constituents are removed.

If the organic compounds include volatile organic compounds, the flash point or ignition temperature of the volatile organic compound is taken into consideration during heating. To remove a volatile organic material, the heating has to be done at or above the weight loss onset temperature thereof, but below the flash point. However, if the weight loss onset temperature of the next higher temperature organic is below the flash point of the volatile organic, then the heating temperature will be below the weight loss onset temperature of the next higher temperature organic such that release thereof is not triggered.

Heating in the first firing phase can be a slow heating rate and/or a thermal hold, as determined based on various conditions such product size, load capacity, and kiln conditions, as known in the art. However, an important determining factor is the concentration of LFL in the kiln atmosphere and the maintenance thereof at levels dictated by the National Fire Protection Agency (NFPA) as discussed above. A suitable slow heating rate is 1° C./hr –20° C./hr. The thermal hold is at or above the weight loss onset temperature for a time sufficient to attain substantial removal of the organic compounds.

In an embodiment, the oil is substantially removed prior to the removal of the binder, and other remaining organic compounds. The oil being a volatile material not only has a weight loss onset temperature above which the heating must be done, but also a flash point below which the temperature in the kiln must be maintained to prevent ignition until substantially all the oil is removed. Therefore, the temperature during the first phase of firing is maintained below the flash point of the oil.

Following the first firing phase where the organic components are removed from the green ceramic structural bodies, the second firing phase involves further heating in an oxidizing atmosphere (at up to 21% by volume $O_2$) or another suitable gas, to a temperature and for a time to initiate and sufficiently achieve the conversion to cordierite. Temperatures for this second firing stage range from 600° C. to 1450° C., with holds of 1 hour to 20 hours at top temperatures of 1300° C. to 1450° C. Typical total firing times range between about 20 to 200 hours.

EXAMPLE

To more fully illustrate the invention the following example is provided. Cordierite-forming ceramic batches comprising about 88.6% by weight inorganic powders and about 11.4% by weight organics are prepared and conventionally extruded to form green honeycomb bodies. The bodies are dried and then fired in an oxidizing atmosphere of up to 21% by volume $O_2$, according to the teachings of the present invention.

The organic compounds include an oil, Durasyn® 162 available from Amoco Chemicals, in an amount of about 6.2 wt. % based on the inorganic powder materials, a binder, Methocel® F240M, available Dow Chemical, in an amount of 4.42 wt. % based on the inorganic powder materials, and a surfactant, oleic acid, in an amount of 0.78 wt. % based on the inorganic powder materials. It has been discovered that in this organic system the removal of the oil and binder proves to be problematic.

Referring now to FIG. 1 therein shown is the TGA analysis of the Durasyn® 162 oil and Methocel® F240M binder. The Durasyn® 162 oil has a weight loss onset temperature of approximately 100° C., and a flash point of 155° C. Accordingly, at 100° C. or above Durasyn® 162 oil is released from the green body through the process of evaporation, while above 155° C. the vapors released therefrom ignite. The Methocel® F240M binder has a weight loss onset temperature of approximately 200° C. Accordingly, at 200° C. or above Methocel® F240M binder is released from the green body through the process of decomposition. Therefore, to substantially remove the oil prior to the binder, the heating in the first phase of the firing cycle is maintained below 155° C. but above 100° C.

Figure 2:
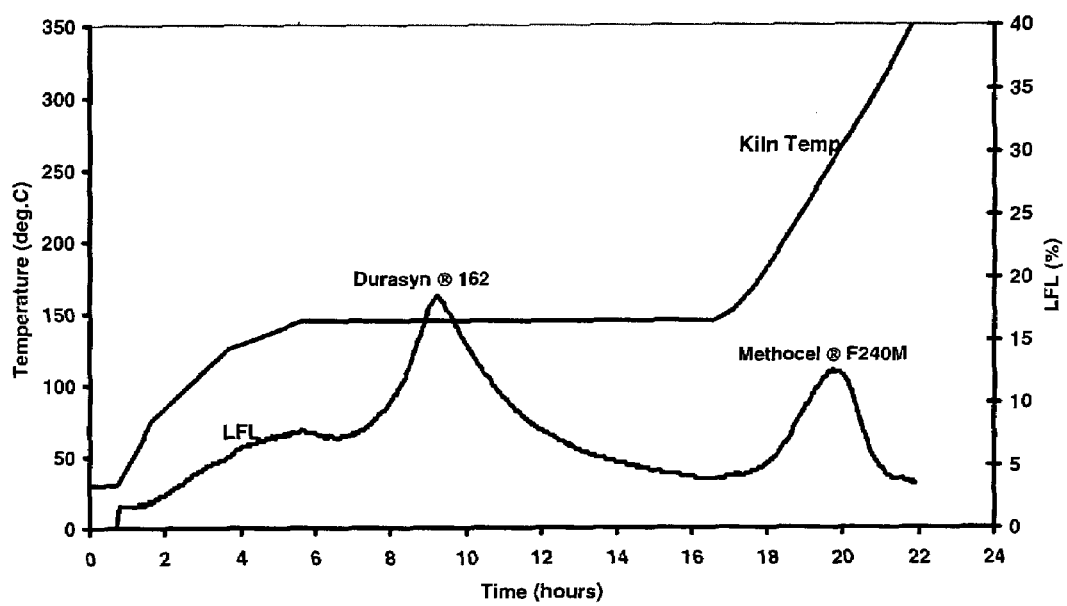
FIG. 2 is a graphical illustration of a firing cycle according to the present invention wherein Durasyn® 162 oil is removed at a lower temperature prior to the release of the Methocel® F240M binder; and, FIG. 3 is a graphical representation of a firing cycle having a simultaneous release of oil/binder components.

It is determined that the kiln has a temperature uniformity of ±10° C. at 150° C. Therefore, to avoid having the hottest ceramic body in the kiln from getting close to the flash point of the Durasyn® 162 oil at 155° C., a thermal hold is programmed at 145° C. for 11 hours, as illustrated in FIG. 2. This allows for removal of the Durasyn® 162 oil at a safe LFL level of less than 20%, since the flash point of 155° C. is never reached in the kiln atmosphere. The first peak corresponds to the removal of the Durasyn® 162 oil.

After the Durasyn® 162 oil is substantially removed, the kiln is increased to a temperature of 200° C. to initiate the release of the Methocel® F240M binder which has not been impacted because the temperature is maintained below its weight loss onset temperature. To remove the binder a slow heating rate of 50° C./hr. is used to a temperature of 350° C. Rates of less than 50° C./hr. are also suitable. The second peak corresponds to the removal of the Methocel® F240M binder. Again, a safe LFL level of less than 15% is maintained. Accordingly, the removal of the Durasyn® 162 oil and the Methocel® F240M binder is possible in a safe and effective way without incurring cracking and high levels of combustibles in the kiln atmosphere. Following removal of the organics, the green ceramic parts are further fired in a second phase to a temperature of 1400° C., and a hold of 8 hrs. at top temperature (not shown) to produce cordierite in the final ceramic body.

Figure 3:
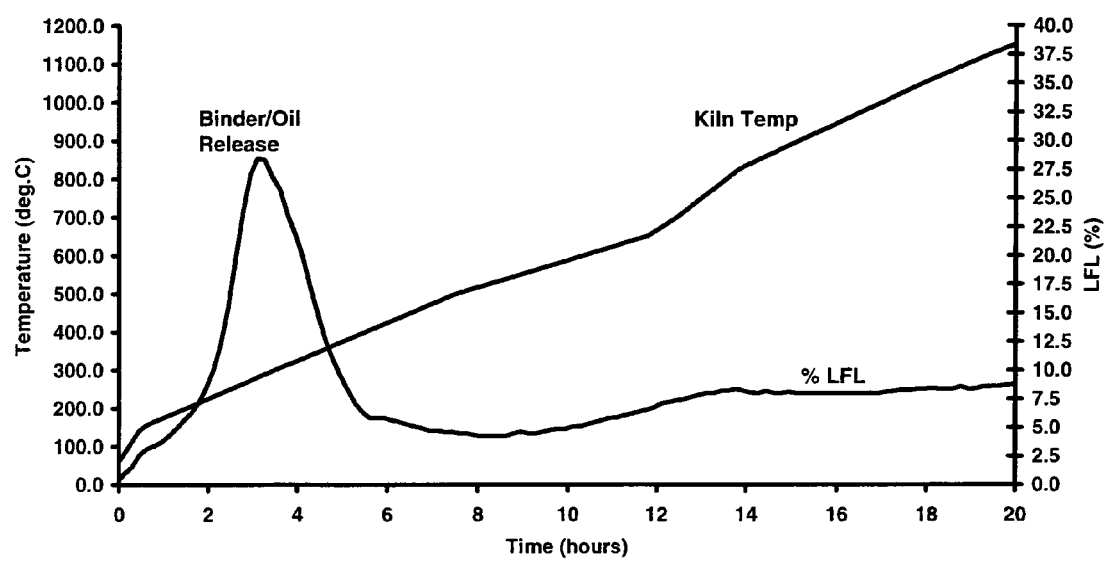

Referring now to FIG. 3 therein shown is a firing cycle which does not provide for sequential removal of organic compounds during firing of a green ceramic body having Durasyn® 162 oil and the Methocel® F240M binder. The firing is via a steadily increasing heating rate, and the single peak indicates both the oil and the binder are released simultaneously. Consequently, higher, cumulative levels of LFL are released in the kiln atmosphere. Also, higher temperatures are required for the removal of the organic compounds.

In summary, advantages of the method of firing of the present invention is the prevention of multiple organics release in the kiln, and the creation of large thermal gradients and cracking in the green ceramic structural bodies, as well as the ability to fire in high-oxygen with increased capacity.

It should be understood that while the present invention has been described in detail with respect to certain illustrative and specific embodiments thereof, it should not be considered limited to such but may be used in other ways without departing from the spirit of the invention and the scope of the appended claims.

The invention claimed is:

1. A method for fabricating a fired ceramic article, the method comprising:
   (a) forming a batch mixture of components comprising inorganic ceramic powder materials and organic compounds, the organic compounds having weight loss onset temperatures of varying values, wherein in a plurality of organic compounds, a first organic compound has a first weight loss onset temperature of lower value, and a second and subsequent organic compound has a higher weight loss onset temperature, the batch mixture being capable of yielding a fired ceramic article;
   (b) intimately blending the components to form a workable and plasticized mixture;
   (c) shaping the plasticized mixture into a green ceramic structural body and thereafter drying;
   (d) following drying, heating the green ceramic structural body in a first phase, the heating being done in an oxidizing atmosphere to a temperature and for a time to enable sequential removal of the organic compounds, such that the organic compound with the first weight loss onset temperature being of lowest value is substantially removed prior to the organic compound with the subsequent higher weight loss onset temperature; and
   (e) further heating the green ceramic structural body in a second phase to a temperature and for a time to achieve the conversion of the green ceramic structural body into a fired ceramic article.

2. The method of claim 1 wherein the inorganic ceramic powder materials include cordierite-forming materials in an amount which is capable of yielding a fired ceramic article whose predominant crystal phase is cordierite.

3. The method of claim 1 wherein the organic compounds include an oil or oil-based compound, a binder and optionally a surfactant.

4. The method of claim 3 wherein the oil or oil-based compound has a flash point in addition to having the weight loss onset temperature, the flash point being of higher value than the weight loss onset temperature.

5. The method of claim 4 wherein the temperature during heating in the first phase is maintained below the flash point of the oil or oil-based compound until said is substantially removed from the green structural body.

6. The method of claim 3 wherein the oil or oil-based compound is a polyalpholefin.

7. The method of claim 3 wherein the oil or oil-based compound is substantially removed prior to the binder.

8. The method of claim 3 wherein the binder is a cellulose ether.

9. The method of claim 8 wherein the cellulose ether binder is methylcellulose, and/or methylcellulose derivatives.

10. The method of claim 1 wherein the green ceramic structural body is heated in the first phase in an oxygen-rich atmosphere having up to 21% by volume $O_2$.

11. A method of firing a green ceramic structural body including an oil or oil-based compound, a binder and optionally other organic components, the method comprising:
   drying the green ceramic structural body,
   following drying, firing the green ceramic structural body in an atmosphere containing up to 21% by volume $O_2$ to a temperature and for a time to substantially remove the oil or oil-based compound prior to release of the binder and other optional organic components; and,
   further firing the green ceramic structural body to a temperature and for a time to achieve the conversion of the green ceramic structural body into a fired ceramic article.

12. The method of claim 11 wherein the oil or oil-based compound is a polyalpholefin.

13. The method of claim 12 wherein the binder is a cellulose ether.

14. The method of claim 13 wherein the cellulose ether binder is methylcellulose, and/or methylcellulose derivatives.

15. The method of claim 11 wherein the further firing of the green ceramic structural body is to a temperature of 1300° C. to 1450° C. with a hold time of 1 hour to 20 hours.

16. The method of claim 1 wherein the green ceramic structural body is heated in the first phase at or above the first weight loss onset temperature, but below the weight loss onset temperature of the second and subsequent organic compound.

17. The method of claim 1 wherein the green ceramic structural body is heated in the first phase to a temperature at or above the first weight loss onset temperature and maintained below the flash point of the second and subsequent organic compound until said first organic compound is substantially removed from the green structural body.

18. A method for fabricating a fired ceramic article, the method comprising the steps of:
- forming a batch mixture of components comprising inorganic ceramic powder materials, an oil or an oil-based organic compound having a first weight loss onset temperature, and an organic binder compound having a second weight loss onset temperature higher than the first weight loss onset temperature;
- blending the components to form a plasticized mixture;
- shaping the plasticized mixture into a green ceramic structural body;
- drying the green ceramic structural body;
- following drying and during firing, heating the green ceramic structural body to a first temperature at or above the first weight loss onset temperature, but below the second weight loss onset temperature for a time to enable substantial removal of the oil or an oil-based organic compound, and then followed by further heating at a temperature at or above the second weight loss onset temperature until there is substantial removal of the organic binder compound; and
- further heating the green ceramic structural body to a temperature and for a time to achieve the conversion of the green ceramic structural body into a fired ceramic article.

19. The method of claim 18 wherein the heating step is carried out in an oxygen controlled atmosphere containing up to 21% $O_2$ by volume.

20. The method of claim 18 wherein the first temperature is below the flash point of the oil or an oil-based organic compound.

21. The method of claim 18 wherein the step of further heating the green ceramic structural body further comprises firing at the temperature of between 600-1450° C. for the time of between 1-20 hours.

* * * * *